United States Patent
Halliday et al.

(10) Patent No.: US 6,790,812 B2
(45) Date of Patent: Sep. 14, 2004

(54) ACID SOLUBLE, HIGH FLUID LOSS PILL FOR LOST CIRCULATION

(75) Inventors: William S. Halliday, Cypress, TX (US); Dennis K. Clapper, Houston, TX (US); Michael Jarrett, Houston, TX (US); Michelle Carr, Waller, TX (US)

(73) Assignee: Baker Hughes Incorporated, Houston, TX (US)

( * ) Notice: Subject to any disclaimer, the term of this patent is extended or adjusted under 35 U.S.C. 154(b) by 197 days.

(21) Appl. No.: 09/997,830

(22) Filed: Nov. 30, 2001

(65) Prior Publication Data

US 2003/0195120 A1 Oct. 16, 2003

(51) Int. Cl.⁷ ................................................ C09K 7/00
(52) U.S. Cl. .................. 507/269; 507/140; 507/906; 175/72
(58) Field of Search ............................ 175/72; 507/140, 507/269, 906

(56) References Cited

U.S. PATENT DOCUMENTS

| | | |
|---|---|---|
| 1,984,668 A | 12/1934 | Weir et al. |
| 3,375,888 A | 4/1968 | Lummus et al. |
| 3,433,740 A | 3/1969 | Armentrout |
| 3,525,397 A | 8/1970 | Darley |
| 4,289,632 A | 9/1981 | Clear |
| 4,422,948 A | 12/1983 | Corley et al. |
| 5,353,874 A * | 10/1994 | Manulik ..................... 166/281 |
| 5,620,947 A | 4/1997 | Elward-Berry |
| H1685 H | 10/1997 | Lau et al. |
| 5,787,332 A | 7/1998 | Black et al. |
| 5,909,774 A | 6/1999 | Griffith et al. |
| 6,016,879 A | 1/2000 | Burts, Jr. |
| 6,131,661 A * | 10/2000 | Conner et al. .............. 166/300 |
| 6,137,006 A | 10/2000 | Thieking et al. |
| 6,143,698 A | 11/2000 | Murphey et al. |
| 6,164,380 A | 12/2000 | Davis |
| 6,258,757 B1 | 7/2001 | Sweatman et al. |
| 6,561,273 B2 * | 5/2003 | Brothers et al. ............ 166/294 |
| 2003/0039616 A1 * | 2/2003 | Maberry et al. ............ 166/294 |

OTHER PUBLICATIONS

Whistler, Roy L., et al., Starch: Chemistry and Technology, Chapter X, pp. 311–388, (1984).

Green, Method for Creating Dense Drilling Fluid Additive and Composition Therefor, U.S. Patent application Publication No. US2002/0147113A1, Published Oct. 10, 2002, pp. 1–6.

* cited by examiner

Primary Examiner—Philip C. Tucker
(74) Attorney, Agent, or Firm—The Morris Law Firm, PC

(57) ABSTRACT

High fluid loss acid soluble lost circulation material and spotting pill comprising the lost circulation material. The spotting pill preferably is weighted to a density substantially the same as the drilling fluid used to treat the formation.

94 Claims, No Drawings

ACID SOLUBLE, HIGH FLUID LOSS PILL FOR LOST CIRCULATION

FIELD OF THE INVENTION

The present invention relates to lost circulation materials (LCM), and to spotting pills containing the LCM. More particularly, the invention relates to acid soluble LCM's, and to spotting pills containing the LCM, preferably to spotting pills having effective rheology and density.

BACKGROUND OF THE INVENTION

Drilling fluids serve various functions, such as promoting borehole stability, removing drilled cuttings from the wellbore, cooling and lubricating the bit and the drillstring, as well as controlling subsurface pressure. Certain subsurface permeable formations can cause, or lead to, "lost circulation," or the loss of whole drilling fluid in quantity to the formation. In such a case, drilling of the well must be stopped and the condition corrected. Examples of such subsurface permeable formations include, but are not necessarily limited to: (1) natural or intrinsic fractures, (2) induced or created fractures; (3) cavernous formations (crevices and channels), and (4) unconsolidated or highly permeable formations (loose gravels).

Lost circulation materials (LCMs), or formation sealing agents, are used to minimize the loss of drilling fluids into subsurface permeable formations by sealing the formation. To prevent blow-out, or the uncontrolled flow of fluids from the formation into the well, a "pill" or slug of the LCM is needed which has a density that is similar to that of the drilling fluid used to treat the formation.

In some cases the formations desired to be sealed may be a potential producing zone for hydrocarbons. Unfortunately, if the sealed formation is a producing formation, it may be difficult to subsequently produce hydrocarbons from the damaged zone. LCM's are needed which permit removal of the seal and allow for full recovery of hydrocarbons from the loss zone.

SUMMARY OF THE INVENTION

The present application provides a high fluid loss spotting pill comprising: a carrier fluid; an LCM consisting essentially of an amount and form of acid soluble mineral particulate; said amount and said form being adapted to form a substantially impermeable, acid soluble filtercake upon injection of said composition with said carrier fluid into said wellbore and defluidization. In a preferred embodiment, the high fluid loss spotting pill preferably further comprises a weighting agent and a suspending agent effective to suspend said weighting agent. The quantity of weighting agent preferably is adapted to produce a density substantially the same as the density of a drilling fluid used to drill a formation being treated.

DETAILED DESCRIPTION OF THE INVENTION

The present invention provides a high fluid loss squeeze type LCM pill for severe fluid losses for use in reservoirs and in general borehole applications. The pill is acid soluble for reservoir applications. The invention provides a high fluid loss LCM; a spotting pill comprising the LCM; a method of weighting up the spotting pill; a weighted spotting pill; and, a fast and effective method of remediation of a reservoir treated by the spotting pill. The LCM is suitable for use in water and oil based applications.

The LCM comprises acid soluble mineral particulates, preferably soluble salts of alkaline earth metals, most preferably calcium. Preferred acid soluble mineral particulates are calcium carbonate, more preferably a combination of granular calcium carbonate, and flaked calcium carbonate. The particulates have various particle size distributions, as defined in the following Table:

| Particle Size Distribution Analyses, in micron ranges | | | |
|---|---|---|---|
| Calcium Carbonate Particulate Type: | D (v, 0.1) | D (v, 0.5) | D (v, 0.9) |
| Fine particulate (based on WO.-30 fine) | 1–10 | 25–35 | 90–120 |
| Coarse particulate (based on W.O.-30 coarse) | 10–20 | 155–175 | 300–400 |
| Fine flake (based on SOLUFLAKE fine) | 10–20 | 160–180 | 400–500 |

The spotting pill comprises the LCM and a carrier fluid, preferably in slurry form. The spotting pill is injected into the loss zone to form a substantially impermeable filtercake to seal pores or fractures in the loss zone. Once the filtercake is thoroughly set, and losses stopped, the filtercake can be later remediated by exposure to an acid wash which solubilizes at least a portion of the filter cake and allows a free flowing reservoir for hydrocarbon production. The lost circulation pill can be used in both producing and non-producing intervals of the wellbore.

The spotting pill also preferably comprises one or more "suspending agents" that are capable of viscosifying the pill. Preferred suspending agents for use in water based slurries or "pills" are non-toxic and include, but are not necessarily limited to clays, water soluble starches and modified versions thereof, water soluble polysaccharides and modified versions thereof, water soluble celluloses and modified versions thereof, and water soluble polyacrylamides and copolymers thereof. Preferred suspending agents for use in oil based slurries or "pills" also are non-toxic and include, but are not necessarily limited to organophilic clays, fatty acids, such as dimer and trimer acids, and latex polymers. Generally, the quantity of suspending agent used is at least about 0.5 lb/bbl. or more, preferably about 2.0 lb/bbl. or more.

Clays that are suitable for use in water based slurries are not organophilic. Clays that are suitable for use in oil-based slurries are organophilic, typically quaternized clays. Suitable clays for either type of slurry or pill include, but are not necessarily limited to bentonite, montmorrillonite, attapulgite, hectorite, sepiolite, and the like. A preferred clay for water based slurries is attapulgite. A preferred clay for oil based slurries is quaternized attapulgite. A most preferred suspending agent, and a preferred clay for use in both types of slurry is a ratio of about 50:50 attapulgite:quaternized attapulgite.

Starches that are suitable for use as suspending agents include, but are not necessarily limited to corn based and potato based starches, preferred starches being more temperature stable starches. Polysaccharides that are suitable for use as suspending agents include, but are not necessarily limited to xanthan polysaccharides, wellan polysaccharides, scleroglucan polysaccharides, and guar polysaccharides. Celluloses that are suitable for use as suspending agents include, but are not necessarily limited to hydrophobically modified hydroxyethyl celluloses and cationic cellulose ethers. Suitable copolymers of acrylamide include copolymers with acrylate monomers.

As used herein, the terms "modified starches" and "modified polysaccharides" or "synthetically modified polysaccharides" refer to starches and polysaccharides that have been modified in a manner that renders them inherently non-fermentable in order to avoid the need for a preservative. Water-soluble "modified starches" and "modified polysaccharides" that should operate successfully as water-soluble polymers include, but are not necessarily limited to: hydroxyalkyl starches and polysaccharides; starch and polysaccharide esters; cross-link starches and polysaccharides; hypochlorite oxidized starches and polysaccharides; starch and polysaccharide phosphate monoesters; cationic starches and polysaccharides; starch and polysaccharide xanthates; and, dialdehyde starches and polysaccharides. These derivatized starches and polysaccharides can be manufactured using known means, such as those set forth in detail in Chapter X of *Starch: Chemistry and Technology* 311–388 (Roy L. Whistler, et al. eds., 1984), incorporated herein by reference.

Specific examples of suitable modified starches and modified polysaccharides include, but are not necessarily limited to: carboxymethyl starches and polysaccharides; hydroxyethyl starches and polysaccharides; hydroxypropyl starches and polysaccharides; hydroxybutyl starches and polysaccharides; carboxymethylhydroxyethyl starches and polysaccharides; carboxymethylhydroxypropyl starches and polysaccharides; carboxymethylhydroxybutyl starches and polysaccharides; epichlorohydrin starches and polysaccharides; alkylene glycol modified starches and polysaccharides; and, other starch and polysaccharide copolymers having similar characteristics.

The LCM

The LCM comprises a mixture of acid soluble components including but not necessarily limited to one or more acid soluble mineral particulates selected from the group consisting of granular and flaked mineral particulates. In a preferred embodiment, the acid soluble mineral particulates are a combination of granular calcium carbonate, and flaked calcium carbonate. By "acid soluble" is meant that an unweighted filter cake formed by the LCM is about 85 wt. % or more acid soluble, preferably 90 wt. % or more acid soluble.

The acid soluble mineral particulate comprises substantially any acid soluble mineral, including but not necessarily limited to salts of alkaline earth metals, preferably carbonates of alkaline earth metals, silicates, hematites, and acid soluble mineral oxides, such as magnesium oxide, zinc oxide, calcium oxide, aluminum oxide, and the like. Preferred acid soluble mineral particulates are selected from the group consisting of carbonates and silicates, most preferably carbonates.

The acid soluble mineral particulate preferably has at least two particle sizes and/or forms. Preferably, the acid soluble mineral particulate is a combination of granular and flake form. The granular form comprises from about 0 to about 99 wt. %, preferably from about 25 to about 50 wt. %, more preferably about 50 wt. % of the LCM; the flake form comprises from about 0 to about 99 wt. %, preferably from about 25 to about 50 wt. %, more preferably about 25 wt. % of the LCM.

The granular acid soluble mineral particulates preferably have a "fine" particle size distribution. Suitable granular calcium carbonates are available from a variety of sources. A preferred granular calcium carbonate is WO-30 fine, available from Baker Hughes INTEQ.

The flaked acid soluble mineral particulates preferably have a "fine" particle size distribution, a preferred average diameter being from about 10 μm to about 400 μm. Suitable flaked acid soluble mineral particulates are available from a variety of commercial sources, and include, but are not necessarily limited calcium carbonate flake fine.

In a preferred embodiment, the acid soluble mineral particulate is calcium carbonate, preferably a combination of calcium carbonate in granular and flake form. A preferred embodiment of a blend without mineral fiber comprises from about 25 to about 50 wt %, preferably about 50 wt. % calcium carbonate flake fine and from about 25 to about 50 wt. %, preferably about 50 wt. % calcium carbonate fine.

A most preferred embodiment of a blend without mineral fiber has the following composition, as per a 100-lb. bag, and is suitable for both oil- and water-based systems:

45.3 lb Calcium Carbonate Flake fine 45.3 lb Calcium Carbonate Particulate 4.7 lb Saltwater gel 4.7 lb quaternized attapulgite The calcium carbonate particulate preferably is coarse. The saltwater gel aids in suspending the carbonate additives in the low-weight range of water-based slurries; quaternized attapulgite suspends the carbonate additives in oil-based slurries. Lime at 1 lb/bbl improves rapid filtration rates of the water-based slurries, particularly for the higher weight range (14 lb/gal and greater). For the oil-based formulations, it is preferred to use a wetting agent, such as OMNI-COTE®, at 0.5–1.0 lb/gal, when preparing the high density range fluids (16–18 lb/gal) to help wet the barite, thus making the slurries more pumpable. This LCM blend exhibited an acid solubility of 90.6%.

In another preferred embodiment, the LCM also comprises acid soluble mineral fiber. Mineral fibers are high purity mineral ores in fiber form that are available from a variety of commercial sources. Preferred acid soluble mineral fibers are extruded mineral wool, more preferably "fine" mineral wool. As used herein, the word "fine" means mineral fibers or wool having a diameter of from about 4 μm to about 20 μm, preferable from about 5 μm to about 6 μm, and a length of about 200 μm or less, preferably about 150 μm or less, more preferably from about 8 μm to about 25 μm. A most preferred embodiment comprising mineral fiber has the following composition:

at least about 10 wt. % mineral fiber, preferably about 25 wt. % fine mineral fiber;

from about 25 to about 50% granular acid soluble particulate, preferably fine particulate, preferably 50% granular acid soluble particulate fine, most preferably 50% calcium carbonate fine; and from about 25 to about 50% acid soluble fine mineral flakes, preferably about 25 wt. % acid soluble mineral flake fine, most preferably about 25 wt. % calcium carbonate flake fine.

The acid soluble mineral particulates preferably have a particle size distribution effective to form a filter cake to block lost circulation of the drilling fluid to the formation, and to permit effective disintegration upon exposure to an acid wash. Depending upon the type of formation to be sealed, the acid soluble mineral comprises particles ranging in mesh size from about 10 to about 25 mesh. In the foregoing preferred embodiment, the following weight percent of the LCM passes through screens having the following mesh sizes:

| | |
|---|---|
| 10 | 5% to 10% |
| 14 | 5% to 10% |
| 18 | 1% to 5% |
| 20 | 1% to 5% |
| 25 | 1% to 5% |
| >25 | 87% to 65% |

Most preferably,

| | |
|---|---|
| 10 | 8% |
| 14 | 7% |
| 18 | 3% |
| 20 | 1% |
| 25 | 1% |
| >25 | 80% |

The Spotting Pill

In order to prepare a spotting pill, the LCM is mixed with a carrier fluid that is compatible with the drilling fluid being used, such as water, brine, synthetic, or natural hydrocarbons, and the like. Where the base fluid is aqueous, the carrier preferably is aqueous. Where the base fluid is a natural or synthetic oil, the carrier fluid preferably is a natural or synthetic oil, etc.

A high fluid loss rate is desirable so that when the slurry is placed within the zone of loss, the fluid rapidly enters the surrounding formation, thereby depositing a substantially impermeable filtercake or seal. In general, the higher the fluid loss rate, the thicker the filtercake in a given length of time, the more effective the LCM slurry. Fluid loss preferably is as high as possible while maintaining other properties in the desired ranges. As used herein, the term "high fluid loss" is defined to mean that defluidization occurs in 3 minutes or less, preferably 2 minutes or less, using a standard API fluid loss test (100 psi differential), and the following parameters:

30 lb/bbl system

Whatman 541 filter paper 100 psi.

The resulting filtercake can have any hardness effective to seal the formation. Preferably, the filtercake has a hardness measured by a durometer, such as a PTC Instruments, Model No. 411, of 30 or more, more preferably 40 or more, most preferably 50 or more.

The LCM may be premixed with the carrier fluid to form a slurry, mixed on site in slugging pits, or transferred by cement pumps. A sufficient amount of the LCM is added to the carrier fluid to form a slurry having substantially the same density as the drilling mud or drilling fluid being used. Conventional additives may be used as long as they do not interfere with the function or disintegration of the filtercake.

To prevent blow-out, or the uncontrolled flow of fluids from the formation into the well, the drilling fluid must have a density effective to provide a greater pressure than that exerted by the formation fluids. However, the density must not be carried too high, because excessive hydrostatic pressures can cause loss of circulation. Weighting materials frequently are added to increase the density of drilling fluids. A weighting material, such as ground barite, hematite, illmentie, iron carbonate (acid soluble), calcium carbonate (soluble), soluble salts, preferably salts of alkaline earth metals, such as sodium chloride, sodium bromide, calcium chloride, calcium bromide, and the like, preferably is added to adjust the density of the slurry to a desired level. The slurry preferably has a density substantially the same as the formation being treated, which typically is at least 9 lb./gal., and preferably from about 10 to about 18 lb./gal. The slurry generally comprises from about zero to about 600 pounds of barite per slurry.

Where the active, circulating system is weighted with barite or another weighting agent, the pill or slurry preferably is weighted up to substantially the same density in order to prevent pill migration as it is pumped and placed downhole. The normal procedure is to use a reserve, slugging, or other inactive mud pit to mix the pill composition using either water or oil as the makeup fluid depending on whether the active system is a water based or an oil/synthetic based system. A portable tank/mixer or a cement unit also can be used to mix these high fluid loss LCM pills. The weighting agent is added in either sack or bulk form usually through a hopper or, in the case of a high shear mixer, directly to the LCM pill composition, until the desired pill density is reached. Normal weighted pills will range in density from 8.4 to 21 lbs/gal. Normal volume will range from 30 to 200 barrels depending on the hole size being drilled and the extent of the suspected loss zone.

The resulting slurry has an effective plastic viscosity (PV) and yield point (YP). Generally, the yield point (YP) is above a minimum value to adequately suspend the LCM, the weighting materials, for example, barite and the like, if any are present, and any other components used in LCM fluids. Suspending agents are used to increase the yield point of the fluid without unduly increasing its viscosity. Suspending agents preferably act to suspend or prevent settling out of the particulate matter without unduly increasing plastic viscosity or unduly decreasing fluid loss rates. Generally, the yield point for weighted systems is at least about 5 or more, preferably about 8 or more. Materials with yield point values below this minimum value have insufficient suspending ability to adequately suspend the LCM's, weighting materials, and the like. For unweighted systems, it is preferred that the yield point be from about 5 to about 10 or less, preferably from about 1 to about 5 or less to facilitate pumping.

Spotting a slug of the LCM adjacent to the permeable formation is accomplished by methods known in the art. The "thief" or permeable formation usually is at or near the bottom of the wellbore because, when the permeable formation is encountered, drilling fluid immediately is lost to the formation. In such situations the LCM fluid is spotted adjacent to the permeable formation by pumping a slug of the slurry down and out of the drill pipe. If the permeable formation is at a point farther up in the well bore, the drill pipe can be raised so that the slug of the LCM fluid is deposited adjacent the permeable formation.

The location of the loss zone is determined as accurately as possible. The bottom of the drill pipe or bit is placed at a depth that will allow an equivalent of the calculated open-hole volume to remain inside the casing above the casing shoe. The volume of the slug of slurry which is spotted adjacent the permeable formation can range from less than that of the open hole to more than double that of the open hole. The full open hole volume, plus additional barrels are pumped, leaving the remainder of the slurry in the casing. A sufficient quantity of the slurry is added to cover approximately 200% excess of the loss zone. Typically, from about 40 to about 100 bbl of the slurry is added. The spotting pill is pumped at from about 2 to about 10 bbls/min (bpm) with a rig pump until the pill reaches the loss zone at the end of the pipe. At this point the HYDRIL can be closed and a small amount of pressure from 200–400 psi can be applied to the pill to help facilitate movement of the pill to the loss zone and to defluidize the pill to form the LCM plug.

Defluidizing can be accomplished either by hydrostatic pressure or by exerting a low squeeze pressure. Hydrostatic pressure will complete the seal; however, low squeeze pressure is highly desirable because hydrostatic pressure may open incipient fractures or other areas of high permeability. Pumping begins again at from about 1 to about 2 bpm. When a pressure of about 500 psi is obtained, pumping is discontinued for about 20 to about 60 minutes. The procedure is repeated until the required stabilized pressure is reached, at which point the LCM pill has been "defluidized." A stabilized pressure maximum of about 500 to 800 psi is preferred. Once a maximum holding pressure is achieved, the pressure is bled from the annulus and the filtercake is allowed to set for a period ranging from about 2 to 6 hours, preferably from about 3 to 8 hours, more preferably from about 4 to 8 hours. The filtercake produced by the foregoing procedures is effective to seal the formation, and may be herein referred to as a "substantially impermeable" filtercake.

Once set, the substantially impermeable filtercake is remediated by exposure to an acid wash to disintegrate the filtercake. A solution of acid is simply pumped down the well at a flow rate and for a period of time effective to dissolve at least a portion of the acid soluble minerals in the filtercake, thereby causing the filtercake to disintegrate. Preferably, the acid wash disintegrates the filtercake, which is sloughed or washed away. In a preferred embodiment, at least about 85 wt. % of the filtercake is removed by the acid wash, preferably at least about 90 wt. %. Where the LCM contains particulates only, and no mineral fiber, a preferred acid wash comprises an inorganic acid. Suitable inorganic acids include, but are not necessarily limited to hydrochloric acid, hydrobromic acid, nitric acid, chloric acid, sulfuric acid, hydrofluoric acid. The acid may have any concentration as long as it is sufficient to disintegrate the filtercake under the conditions of use. In a preferred embodiment, the acid wash has an acid concentration of from about 5 to about 36%. A preferred inorganic acid is hydrochloric acid at from about 5 to about 36%, preferably from about 5 to about 25%, most preferably about 10%.

Where the LCM contains particulates and mineral fiber, a preferred acid wash comprises both an inorganic acid and an organic acid at a ratio and concentration, respectively, effective to disintegrate the filtercake and convert silicon oxide in the mineral fiber to soluble silicic acid. Substantially any water soluble organic acid may be used in combination with the inorganic acid to treat the mineral fiber. Suitable organic acids include, but are not necessarily limited to acetic acid and citric acid. A preferred acid wash when mineral fibers are present is a 60/40 blend of the inorganic acid and the organic acid, respectively. A preferred organic acid for use in this blend is acetic acid at from about 1 to about 5%, preferably about 3%.

The invention will be better understood with reference to the following Examples, which are illustrative only.

Experimental Blends

The following experimental blends were tested in the following Examples. The fractions refer to a 2 gram sample:
Blend #1
Mineral Fiber Fine ⅓
Calcium Carbonate Flake Fine ⅓
Calcium Carbonate Fine Particulate ⅓
Blend #2
Mineral Fiber Fine ½
Calcium Carbonate Flake Fine ¼
Calcium Carbonate Fine Particulate ¼
Blend #3
Mineral Fiber Fine ¼
Calcium Carbonate Flake Fine ¼
Calcium Carbonate Fine Particulate ½
Blend #4
Mineral Fiber Fine ¼
Calcium Carbonate Flake Fine ½
Calcium Carbonate Fine Particulate ¼

EXAMPLE 2

Particle size distributions were determined for the experimental blends by sonic sifting. Two grams of each blend was sifted for 15 minutes under the following conditions:

| ATM Sonic Sifter Analysis | |
| --- | --- |
| Sample | 2 grams |
| Sift time | 15 minutes |
| Amplitude | 1 |
| Mode | Sift/Pulse |

The results were as follows:
Blend #1
Mineral Fiber Fine ⅓
Calcium Carbonate Flake Fine ⅓
Calcium Carbonate Fine Particulate ⅓

| Screen Mesh Number | Initial Weight | Final Weight | Difference | Weight % Through |
| --- | --- | --- | --- | --- |
| 10 | 49.45 | 49.62 | 0.17 | 8.5% |
| 14 | 48.09 | 48.27 | 0.18 | 9% |
| 18 | 45.47 | 45.57 | 0.10 | 5% |
| 20 | 44.72 | 44.74 | 0.02 | 1% |
| 25 | 44.10 | 44.11 | 0.01 | 0.05% |
| Pan | 157.13 | 158.60 | 1.47 | 73.5% |

Blend #2
Mineral Fiber Fine ½
Calcium Carbonate Flake Fine ¼
Calcium Carbonate Fine Particulate ¼

| Screen Mesh Number | Initial Weight | Final Weight | Difference | Weight % Through |
| --- | --- | --- | --- | --- |
| 10 | 49.45 | 49.60 | 0.15 | 7.5% |
| 14 | 48.09 | 48.29 | 0.20 | 10% |
| 18 | 45.47 | 45.57 | 0.10 | 5% |
| 20 | 44.72 | 44.75 | 0.03 | 1.5% |
| 25 | 44.10 | 44.13 | 0.03 | 1.5% |
| Pan | 157.13 | 158.67 | 1.54 | 77% |

Blend #3
Mineral Fiber Fine ¼
Calcium Carbonate Flake Fine ¼
Calcium Carbonate Fine Particulate ½

| Screen Mesh Number | Initial Weight | Final Weight | Difference | Weight % Through |
|---|---|---|---|---|
| 10 | 49.45 | 49.58 | 0.13 | 6.5% |
| 14 | 48.09 | 48.22 | 0.13 | 6.5% |
| 18 | 45.47 | 45.54 | 0.07 | 3.5% |
| 20 | 44.72 | 44.73 | 0.01 | 0.05% |
| 25 | 44.10 | 44.11 | 0.01 | 0.05% |
| Pan | 157.13 | 158.71 | 1.58 | 79% |

Blend #4
Mineral Fiber Fine ¼
Calcium Carbonate Flake Fine ½
Calcium Carbonate Fine Particulate ¼

| Screen Mesh Number | Initial Weight | Final Weight | Difference | Weight % Through |
|---|---|---|---|---|
| 10 | 49.45 | 49.48 | 0.03 | 1.5% |
| 14 | 48.09 | 48.18 | 0.09 | 4.5% |
| 18 | 45.47 | 45.49 | 0.02 | 1% |
| 20 | 44.72 | 44.73 | 0.01 | 0.5% |
| 25 | 44.10 | 44.12 | 0.02 | 1% |
| Pan | 157.13 | 158.93 | 1.80 | 90% |

Competitive Product A

| Screen Mesh Number | Initial Weight | Final Weight | Difference | Weight % Through |
|---|---|---|---|---|
| 10 | 49.45 | 49.61 | 0.16 | 8% |
| 14 | 48.09 | 48.26 | 0.17 | 8.5% |
| 18 | 45.47 | 45.68 | 0.21 | 10.5% |
| 20 | 44.72 | 44.84 | 0.12 | 6% |
| 25 | 44.10 | 44.20 | 0.10 | 5% |
| Pan | 157.13 | 158.37 | 1.24 | 62% |

EXAMPLE 3

A standard API fluid loss test (100 psi differential), was performed on the four experimental blends described in Examples 1–2 and compared to two other commercially available products using the following parameters:

30 lb/bbl system
Whatman 541 filter paper
100 psi.

The carrier fluid was water. In weighted slurries, the amount of water used was sufficient to give 350 ml of finished product. After the product had been added to the water, stirring of the resulting slurry continued for 10 minutes at low shear of 1500 rpm. After stirring, the slurry was transferred to a standard API filter press cell containing the Whatman filter paper at the base. At a pressure of 100 psi, the time required for complete fluid loss was recorded. The results are shown below.

| Product | Time (seconds) | Amount (ml) |
|---|---|---|
| Blend #1 | 16 | 162.09 |
| Blend #2 | 13 | 160.12 |

-continued

| Product | Time (seconds) | Amount (ml) |
|---|---|---|
| Blend #3 | 13 | 164.91 |
| Blend #4 | 12 | 162.06 |
| Competitive Product A | 13 | 162.24 |
| Competitive Product B | 24 | 157.61 |

The rate of complete fluid loss of Blend #4 was slightly lower than the other blends.

EXAMPLE 4

The procedures of Example 3 were repeated using a pressure of 50 psi, also measuring the hardness of the filtercake formed. The following are the results:

| Product | Time (sec) | Amount (ml) | Filtercake Thickness (cm) | Filtercake Hardness | Comments |
|---|---|---|---|---|---|
| Blend #1 | 19 | 162.67 | 0.6 | 31 | |
| Blend #2 | 17 | 160.7 | 0.6 | 33 | |
| Blend #3 | 17 | 162.14 | 0.55 | 51 | Has more calcium medium than other blends. |
| Blend #4 | 20 | 163.41 | 0.6 | 34 | |
| Competitive Product A | 19 | 159.46 | 0.7 | 15 | Surface uneven. |
| Competitive Product B | 33 | 155.68 | 0.65 | 59 | |

Blend #3 exhibited a relatively rapid fluid loss combined with a high durometer hardness filtercake.

The filtercakes formed by the experimental blends had two distinct layers. The actual mineral fiber component of the blend was in the lower layer. These filtercakes seemed fragile. Two layers were also seen with the Competitive Product A and the filtercake was very fragile. Competitive Product B filtercake was indeed a rigid plug, as the literature suggests.

EXAMPLE 5

The procedures of Examples 2 and 3 were followed to form a filter cake, with the exception that no filter paper was used. A standard seawater drilling mud was prepared having the following composition:

| Mud Formulation | | |
|---|---|---|
| Component | Concentration | Amount |
| Tapwater | 1.0 bbl | 3500 ml |
| Bentonite | 10 ppb | 100 g |
| NaCl | 14 ppb | 140 g |
| Chrome lignosulfonate | 5 ppb | 50 g |
| Lignite | 3 ppb | 30 g |
| Caustic soda | 1 ppb | 10 g |
| Soda Ash | 1 ppb | 10 g |
| PAC LV | 0.5 ppb | 5 g |

One lab barrel of the mud was run through the filtercake formed above for 30 minutes at 100 psi. The fluid loss was recorded, as follows:

Results:

| | |
|---|---|
| Blend #1 | 19.6 ml |
| Blend #2 | 23.5 ml |
| Blend #3 | 18.5 ml |
| Blend #4 | 18.5 ml |
| Competitive Product A | 53 ml |
| Competitive Product B | 30 ml |

Blends #3 and #4, which contained 25% mineral fiber, exhibited the least fluid loss, thus indicative of better sealing-off of further fluid invasion.

EXAMPLE 6

Blend #3 slurries in either water or oil were weighted up with barite to produce slurries having from 10 to 18 lb/gal. The filtration rates were measured and filtercake properties noted. The weighted up slurries exhibited desirable high filtration rates. Filter cake depositions were good, comparable to those prepared with Competitive Product B. Minimal treatments with either saltwater gel (attapulgite, for water based fluids) or quaternized attapulgite (for oil based fluids) were necessary to help suspend Blend #3 in the low weight ranges. A surfactant or wetting agent was used at 1 lb/bbl to help wet the barite in the 18 lb/gal range; the same was true for Competitive Product B.

The following Table give the water-based slurry formulations used:

| Weight, lb/gal | 10 | 12 | 14 | 16 | 18 |
|---|---|---|---|---|---|
| Water, bbl | 0.90 | 0.83 | 0.76 | 0.69 | 0.62 |
| Saltwater gel, lb | 3.0 | 3.0 | 3.0 | 2.0 | 1.0 |
| Competitive Product B, lb | 42.6 | 35.8 | 29.3 | 23.9 | 18.4 |
| Barite, lb | 60 | 180 | 290 | 400 | 520 |

| Weight (ppg) | 10 | 12 | 14 | 16 | 18 |
|---|---|---|---|---|---|
| Water, bbl | 0.90 | 0.83 | 0.76 | 0.69 | 0.62 |
| Blend #3, lb | 42.6 | 35.8 | 29.3 | 23.9 | 18.4 |
| Barite, lb | 60 | 180 | 290 | 400 | 520 |

In order to weight up the water based slurries, water, lost circulation material, and barite were weighed out according to the following formulations tables. If used, the saltwater gel was added to water and mix for 10 minutes at 1500 rpm. The LCM was added and the resulting fluid was mixed for one minute at 2000 rpm. Then, the barite was added and the resulting fluid was mixed for 5 minutes at 2000 rpm. A higher shear of 3000 rpm was used for the final mixing step of the 18 lb/gal slurries.

After mixing, the slurry was loaded into an API cell and the fluid loss test was run at 100 psi with no filter paper. The fluid amount was recorded at minute intervals until blowout, and then a final fluid loss was recorded at blowout. The fluid retained in the filtercake was calculated and recorded. Also, the filtercake thickness and hardness were recorded.

The following Tables give the filtration rates of the water-based weight-up slurries:

Blend #3

| Weight | Fluid Retained (mls) | Fluid Loss (mls) | Time | Filtercake Thickness | Filtercake Hardness |
|---|---|---|---|---|---|
| 10 ppg | 40 | 220 | 1 minute | 1.8 cm | 40 |
| | | 275 | 1 min 31 sec | | |
| 12 ppg | 35.5 | 170 | 1 minute | 2.5 cm | 45 |
| | | 255 | 1 min 51 sec | | |
| 14 ppg | 61 | 145 | 1 minute | 3.1 cm | 15 |
| | | 190 | 2 minutes | | |
| | | 205 | 2 min 17 sec | | |
| 16 ppg | 66.5 | 110 | 1 minute | 3.6 cm | 58 |
| | | 160 | 2 minutes | | |
| | | 175 | 2 min 40 sec | | |
| 18 ppg | 67 | 80 | 1 minute | 4.1 cm | 40 |
| | | 120 | 2 minutes | | |
| | | 145 | 3 minutes | | |
| | | 150 | 3 min 18 sec | | |
| 18 ppg | 67 | 90 | 1 minute | 4.5 cm | 35 |
| | | 140 | 2 minutes | | |
| | | 150 | 2 min 46 sec | | |

Competitive Product B

| Weight | Fluid Retained (mls) | Fluid Loss (mls) | Time | Filtercake Thickness | Filtercake Hardness |
|---|---|---|---|---|---|
| 10 lb/gal | 55 | 200 | 1 minute | 1.9 cm | 65 |
| | | 260 | 1 min 35 sec | | |
| 12 lb/gal | 60.5 | 175 | 1 minute | 2.5 cm | 65 |
| | | 230 | 1 min 55 sec | | |
| 14 lb/gal | 66 | 150 | 1 minute | 3.3 cm | 60 |
| | | 200 | 2 min 7 sec | | |
| 16 lb/gal | 61.5 | 125 | 1 minute | 3.8 cm | 60 |
| | | 175 | 2 minutes | | |
| | | 180 | 2 min 11 sec | | |
| 18 lb/gal | 77 | 100 | 1 minute | 4.6 cm | 40 |
| | | 125 | 2 minutes | | |
| | | 140 | 2 min 18 sec | | |

The following Table give the oil-based slurry formulations used:

| Density, lb/gal | 10 | 12 | 14 | 16 | 18 |
|---|---|---|---|---|---|
| Oil, bbl | 0.876 | 0.805 | 0.735 | 0.666 | 0.596 |
| (g) | 261 | 240 | 219 | 198 | 177 |
| Quaternized attapulgite, lb | 3 | 2 | 1 | 1 | — |
| Competitive Product B, lb | 42.6 | 35.8 | 29.3 | 23.9 | 18.4 |
| Barite, lb | 115 | 230 | 342 | 454 | 564 |
| Omni-Cote, lb | — | — | — | — | 1.0 |

| Density | 10 | 12 | 14 | 16 | 18 |
|---|---|---|---|---|---|
| Oil, bbl | 0.876 | 0.805 | 0.735 | 0.666 | 0.596 |
| (g) | 261 | 240 | 219 | 198 | 177 |
| Quaternized attapulgite, lb | 3 | 2 | 1 | 1 | — |

-continued

| Density | 10 | 12 | 14 | 16 | 18 |
|---|---|---|---|---|---|
| Blend #3 | 42.6 | 35.8 | 29.3 | 23.9 | 18.4 |
| Barite, lb | 115 | 230 | 342 | 454 | 564 |
| Omni-Cote, lb | — | — | — | — | 1.0 |

In order to weight up the oil based slurries, oil, lost circulation material, and barite were weighed out according to formulations tables. If used, quaternized attapulgite was added and mixed for 10 minutes at 1500 rpm. The LCM was added and the fluid was mixed for one minute at 2000 rpm. The barite was then added and the fluid was mixed for 5 minutes at 2000 rpm. The slurry was then loaded into an API cell and the fluid loss test was run at 100 psi with no filter paper. The fluid amount was recorded at minute intervals until blowout, and then a final fluid loss was recorded at blowout. The fluid retained in the filtercake was calculated and recorded. Also filtercake thickness and hardness were recorded. The results are given in the following Tables:

Blend #3

| Weight | Fluid Retained (mls) | Fluid Loss (mls) | Time | Filtercake Thickness | Filtercake Hardness |
|---|---|---|---|---|---|
| 10 ppg | 26.3 | 80 | 1 minute | 2.5 cm | 5 |
|  |  | 125 | 2 minutes |  |  |
|  |  | 160 | 3 minutes |  |  |
|  |  | 190 | 4 minutes |  |  |
|  |  | 220 | 5 minutes |  |  |
|  |  | 245 | 6 minutes |  |  |
|  |  | 265 | 7 minutes |  |  |
|  |  | 280 | 8 minutes |  |  |
|  |  | 300 | 8 min 38 sec |  |  |
| 12 ppg | 25 | 75 | 1 minute | 3.2 cm | 10 |
|  |  | 100 | 2 minutes |  |  |
|  |  | 130 | 3 minutes |  |  |
|  |  | 150 | 4 minutes |  |  |
|  |  | 170 | 5 minutes |  |  |
|  |  | 185 | 6 minutes |  |  |
|  |  | 200 | 7 minutes |  |  |
|  |  | 210 | 8 minutes |  |  |
|  |  | 225 | 9 minutes |  |  |
|  |  | 240 | 10 minutes |  |  |
|  |  | 250 | 11 minutes |  |  |
|  |  | 265 | 12 minutes |  |  |
|  |  | 275 | 13 minutes |  |  |
| 14 ppg | 48.8 | 85 | 1 minute | 3.6 | <5 |
|  |  | 125 | 2 minutes |  |  |
|  |  | 145 | 3 minutes |  |  |
|  |  | 170 | 4 minutes |  |  |
|  |  | 185 | 5 minutes |  |  |
|  |  | 200 | 6 minutes |  |  |
|  |  | 220 | 7 minutes |  |  |
|  |  | 225 | 7 min 35 sec |  |  |
| 16 ppg | 57.5 | 65 | 1 minute | 4.0 cm | <5 |
|  |  | 85 | 2 minutes |  |  |
|  |  | 105 | 3 minutes |  |  |
|  |  | 125 | 4 minutes |  |  |
|  |  | 145 | 5 minutes |  |  |
|  |  | 160 | 6 minutes |  |  |
|  |  | 170 | 7 minutes |  |  |
|  |  | 190 | 8 min 10 sec |  |  |
| 18 ppg | 41.3 | 50 | 1 minute |  |  |
|  |  | 60 | 2 minutes |  |  |
|  |  | 70 | 3 minutes |  |  |
|  |  | 75 | 4 minutes |  |  |
|  |  | 85 | 5 minutes |  |  |
|  |  | 95 | 6 minutes |  |  |
|  |  | 105 | 7 minutes |  |  |
|  |  | 110 | 8 minutes |  |  |

-continued

Blend #3

| Weight | Fluid Retained (mls) | Fluid Loss (mls) | Time | Filtercake Thickness | Filtercake Hardness |
|---|---|---|---|---|---|
|  |  | 115 | 9 minutes |  |  |
|  |  | 125 | 10 minutes |  |  |
|  |  | 155 | 15 minutes |  |  |
|  |  | 175 | 20 minutes |  |  |
|  |  | 180 | 21 minutes |  |  |

*Test was mistakenly thought to be finished. But when the cell was opened up, there was still oil on top of the filtercake. Test was put back on and continued for another 15 minutes.

Competitive Product B

| Weight | Fluid Retained (mls) | Fluid Loss (mls) | Time | Filtercake Thickness | Filtercake Hardness |
|---|---|---|---|---|---|
| 10 ppg | 31.3 | 120 | 1 minute | 2.2 cm | 25 |
|  |  | 150 | 2 minutes |  |  |
|  |  | 175 | 3 minutes |  |  |
|  |  | 200 | 4 minutes |  |  |
|  |  | 220 | 5 minutes |  |  |
|  |  | 240 | 6 minutes |  |  |
|  |  | 250 | 7 minutes |  |  |
|  |  | 265 | 8 minutes |  |  |
|  |  | 275 | 9 minutes |  |  |
|  |  | 295 | 10 min 6 sec |  |  |
| 12 ppg | 52 | 100 | 1 minute | 2.9 cm | <5 |
|  |  | 125 | 2 minutes |  |  |
|  |  | 145 | 3 minutes |  |  |
|  |  | 165 | 4 minutes |  |  |
|  |  | 180 | 5 minutes |  |  |
|  |  | 195 | 6 minutes |  |  |
|  |  | 205 | 7 minutes |  |  |
|  |  | 220 | 8 minutes |  |  |
|  |  | 240 | 9 minutes |  |  |
|  |  | 245 | 10 minutes |  |  |
|  |  | 248 | 10 min 16 sec |  |  |
| 14 ppg | 68.8 | 70 | 1 minute | 3.2 | <5 |
|  |  | 125 | 2 minutes |  |  |
|  |  | 155 | 3 minutes |  |  |
|  |  | 170 | 4 minutes |  |  |
|  |  | 185 | 5 minutes |  |  |
|  |  | 200 | 6 minutes |  |  |
|  |  | 205 | 6 min 21 sec |  |  |
| 16 ppg | 72.5 | 80 | 1 minute | 4.4 cm | <5 |
|  |  | 105 | 2 minutes |  |  |
|  |  | 130 | 3 minutes |  |  |
|  |  | 145 | 4 minutes |  |  |
|  |  | 155 | 5 minutes |  |  |
|  |  | 175 | 5 min 55 sec |  |  |
| 18 ppg | 71.3 | 20 | 1 minute | 4.6 | 31 |
|  |  | 50 | 2 minutes |  |  |
|  |  | 75 | 3 minutes |  |  |
|  |  | 85 | 4 minutes |  |  |
|  |  | 100 | 5 minutes |  |  |
|  |  | 125 | 6 minutes |  |  |
|  |  | 135 | 8 minutes |  |  |
|  |  | 140 | 9 minutes |  |  |
|  |  | 148 | 10 minutes |  |  |
|  |  | 150 | 11 minutes |  |  |

Filtercakes produced by Competitive Product B contracted at 14 ppg and above. The contraction is believed to contribute to faster fluid loss times. The Blend #3 filter cakes have two layers, with the mineral fibers making up the lower part of the filtercake. Competitive Product B behaves in a similar manner, but the thickness of the filtercake seems to be the same among all the filtercakes.

EXAMPLE 7

The acid solubility of Blend #3 was compared to that of Competitive Product B. 5 grams of Blend #3 was weighed out, mixed with a 60:40 blend of 10% hydrochloric acid and 3% acetic acid, respectively, and the mixture was heated to 170° F. The mixture was filtered through magnetic stirrer and heated to 170° F. for 45 minutes. Then, the mixture was filtered through a #42 Whatman filter paper (2.7 micron) using a Buchner funnel under vacuum. The residue was weighed and the percent acid solubility calculated.

Blend #3 exhibited excellent acid solubility. Results were, as follows:

| | |
|---|---|
| Blend #3: | 1.96% acid insoluble |
| Competitive Product A | 81.3% acid insoluble |
| Competitive Product B | 84.4% acid insoluble |

EXAMPLE 8

A blend without mineral fiber was investigated. A 50:50 blend of calcium carbonate flake fine and calcium carbonate particulate coarse was found to be satisfactory as a high fluid-loss LCM additive. The following one-package composition, as per a 100-lb bag, was suitable for both oil- and water-based systems:

45.3 lb Calcium Carbonate Flake fine
45.3 lb Calcium Carbonate particulate coarse
4.7 lb Saltwater gel
4.7 lb quaternized attapulgite The saltwater gel aided in suspension of the carbonate additives in the low-weight range of water-based slurries; quaternized attapulgite suspended the carbonate additives in oil-based slurries.

Lime at 1 lb/bbl was found beneficial for improving rapid filtration rates of the water-based slurries, particularly for the higher weight range (14 lb/gal and greater); it is surmised that the clay component of the LCM blend is being flocculated. For the oil-based formulations, a wetting agent, such as OMNI-COTE®, at 0.5–1.0 lb/gal, was preferred when preparing the high density range fluids (16–18 lb/gal) to help wet the barite, thus making the slurries more pumpable.

This LCM blend exhibited an acid solubility of 90.6%, which is considerably better than that of the competition.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A high fluid loss spotting pill comprising:
    a carrier fluid;
    a first quantity of weighting agent;
    a second quantity of suspending agent effective to suspend said weighting agent;
    an LCM consisting essentially of:
        a third quantity of acid soluble mineral fiber; and,
        an amount of acid soluble mineral particulate comprising a
        combination of granular form and flake form; said third quantity, said amount and said form being adapted to form a
    substantially impermeable, acid soluble filtercake upon injection of said composition with said carrier fluid into a wellbore and
    defluidization.

2. The high fluid loss spotting pill of claim 1 wherein said first quantity of weighting agent is adapted to produce a density substantially the same as the density of a drilling fluid used to drill a formation being treated.

3. The high fluid loss spotting pill of claim 1 wherein said first quantity of weighting agent produces a spotting pill having a density of at least about 9 ppg.

4. The high fluid loss spotting pill of claim 1 wherein 85 wt. % or more of said LCM is acid soluble.

5. The high fluid loss spotting pill of claim 1 wherein 90 wt. % or more of said LCM is acid soluble.

6. The high fluid loss spotting pill of claim 2 wherein 85 wt. % or more of said LCM is acid soluble.

7. The high fluid loss spotting pill of claim 2 wherein 90 wt. % or more of said LCM is acid soluble.

8. The high fluid loss spotting pill of claim 3 wherein 85 wt. % or more of said LCM is acid soluble.

9. The high fluid loss spotting pill of claim 3 wherein 90 wt. % or more of said LCM is acid soluble.

10. The high fluid loss spotting pill of claim 1 wherein said acid soluble mineral particulate is selected from the group consisting of salts of alkaline earth metals, silicates, hematites, and acid soluble mineral oxides.

11. The high fluid loss spotting pill of claim 1 wherein said acid soluble mineral particulate is selected from the group consisting of preferably carbonates of alkaline earth metals and silicates of alkaline earth minerals.

12. The high fluid loss spotting pill of claim 1 wherein said acid soluble mineral particulate is a carbonate of an alkaline earth metal.

13. The high fluid loss spotting pill of claim 12 wherein said granular form is coarse grain and said flake form is fine grain.

14. The high fluid loss spotting pill of claim 1 wherein said granular form is coarse grain and said flake form is fine grain.

15. The high fluid loss spotting pill of claim 2 wherein said acid soluble mineral particulate is selected from the group consisting of salts of alkaline earth metals, silicates, hematites, and acid soluble mineral oxides.

16. The high fluid loss spotting pill of claim 2 wherein said acid soluble mineral particulate is selected from the group consisting of carbonates of alkaline earth metals and silicates of alkaline earth minerals.

17. The high fluid loss spotting pill of claim 2 wherein said acid soluble mineral particulate is a carbonate of an alkaline earth metal.

18. The high fluid loss spotting pill of claim 2 wherein said granular form is coarse grain and said flake form is fine grain.

19. The high fluid loss spotting pill of claim 3 wherein said acid soluble mineral particulate is selected from the group consisting of salts of alkaline earth metals, silicates, hematites, and acid soluble mineral oxides.

20. The high fluid loss spotting pill of claim 3 wherein said acid soluble mineral particulate is selected from the group consisting of carbonates of alkaline earth metals and silicates of alkaline earth minerals.

21. The high fluid loss spotting pill of claim 3 wherein said acid soluble mineral particulate is a carbonates of an alkaline earth metal.

22. The high fluid loss spotting pill of claim 3 wherein said granular form is coarse grain and said flake form is fine grain.

23. The high fluid loss spotting pill of claim 1 having a yield point of about 5 or more.

24. The high fluid loss spotting pill of claim 2 having a yield point of about 5 or more.

25. The high fluid loss spotting pill of claim 3 having a yield point of about 5 or more.

26. A high fluid loss spotting pill comprising:
a carrier fluid;
a first quantity of weighting agent adapted to produce a density substantially the same as the density of a drilling fluid used to drill a formation being treated;
a second quantity of suspending agent effective to suspend said weighting agent in said carrier fluid;
an LCM consisting essentially of:
a third quantity of acid soluble mineral fiber; and;
an amount of acid soluble mineral particulate wherein said acid soluble mineral particulate is a combination of granular form and flake form;
said third quantity, said amount, and said form being adapted to form a substantially impermeable, acid soluble filtercake upon injection of said composition with an effective carrier fluid into said wellbore and defluidization.

27. The high fluid loss spotting pill of claim 26 wherein said first quantity of weighting agent produces a spotting pill having a density of at least about 9 ppg.

28. The high fluid loss spotting pill of claim 26 wherein 85 wt. % or more of said LCM is acid soluble.

29. The high fluid loss spotting pill of claim 26 wherein 90 wt. % or more of said LCM is acid soluble.

30. The high fluid loss spotting pill of claim 27 wherein 85 wt. % or more of said LCM is acid soluble.

31. The high fluid loss spotting pill of claim 27 wherein 90 wt. % or more of said LCM is acid soluble.

32. The high fluid loss spotting pill of claim 26 wherein said acid soluble mineral particulate is selected from the group consisting of salts of alkaline earth metals, silicates, hematites, and acid soluble mineral oxides.

33. The high fluid loss spotting pill of claim 26 wherein said acid soluble mineral particulate is selected from the group consisting of carbonates of alkaline earth metals and silicates of alkaline earth minerals.

34. The high fluid loss spotting pill of claim 26 wherein said acid soluble mineral particulate is a carbonate of an alkaline earth metal.

35. A high fluid loss spotting pill comprising:
a carrier fluid;
a first quantity of weighting agent adapted to produce a density substantially the same as the density of a drilling fluid used to drill a formation being treated;
a second quantity of suspending agent effective to suspend said weighting agent in said carrier fluid;
an LCM consisting essentially of:
a third quantity of acid soluble mineral fiber; and;
an amount of acid soluble mineral particulate comprising a combination comprising granular form and flake form;
wherein said acid soluble mineral particulate is selected from the group consisting of carbonates of alkaline earth metals and silicates of alkaline earth minerals;
said third quantity, said amount, and said form being adapted to form a substantially impermeable, acid soluble filtercake upon injection of said composition with an effective carrier fluid into said wellbore and defluidization.

36. A high fluid loss spotting pill comprising:
a carrier fluid;
a first quantity of weighting agent adapted to produce a density substantially the same as the density of a drilling fluid used to drill a formation being treated;
a second quantity of suspending agent effective to suspend said weighting agent in said carrier fluid;
an LCM consisting essentially of:
a third quantity of acid soluble mineral fiber; and;
an amount of acid soluble mineral particulate comprising a carbonate of an alkaline earth metal, wherein said acid soluble mineral particulate is a combination of granular form and flake form;
said third quantity, said amount, and said form being adapted to form a substantially impermeable, acid soluble filtercake upon injection of said composition with an effective carrier fluid into said wellbore and defluidization.

37. The high fluid loss spotting pill of claim 35 wherein said granular form is fine grain and said flake form is fine grain.

38. The high fluid loss spotting pill of claim 27 wherein said acid soluble mineral particulate is selected from the group consisting of salts of alkaline earth metals, silicates, hematites, and acid soluble mineral oxides.

39. The high fluid loss spotting pill of claim 27 wherein said acid soluble mineral particulate is selected from the group consisting of carbonates of alkaline earth metals and silicates of alkaline earth minerals.

40. The high fluid loss spotting pill of claim 27 wherein said acid soluble mineral particulate is calcium carbonate.

41. A high fluid loss spotting pill comprising:
a carrier fluid;
a first quantity of weighting agent adapted to produce said spotting pill having a density of about 9 ppg;
a second quantity of suspending agent effective to suspend said weighting agent in said carrier fluid;
an LCM consisting essentially of:
a third quantity of acid soluble mineral fiber; and;
an amount of acid soluble mineral particulate comprising calcium carbonate comprising a combination of granular form and flake form;
said third quantity, said amount, and said form being adapted to form a substantially impermeable, acid soluble filtercake upon injection of said composition with an effective carrier fluid into a wellbore and defluidization.

42. The high fluid loss spotting pill of claim 41 wherein said granular form is fine grain and said flake form is fine grain.

43. The high fluid loss spotting pill of claim 26 having a yield point of about 5 or more.

44. The high fluid loss spotting pill of claim 27 having a yield point of about 5 or more.

45. A high fluid loss spotting pill comprising:
a carrier fluid;
a first quantity of weighting agent adapted to produce a density substantially the same as the density of a drilling fluid used to drill a formation being treated;
a second quantity of suspending agent effective to suspend said weighting agent in said carrier fluid;
an amount of LCM consisting essentially of calcium carbonate particulate comprising granular form and flake form;
said quantity, said amount, and said form being adapted to form a substantially impermeable, acid soluble filtercake upon injection of said composition with an effective carrier fluid into said wellbore and defluidization.

46. The high fluid loss spotting pill of claim 45 wherein said granular form is coarse grain and said flake form is fine grain.

47. The high fluid loss spotting pill of claim 45 wherein said first quantity of said weighting agent produces a spotting pill having a density of at least about 9 ppg.

48. The high fluid loss spotting pill of claim 46 wherein said first quantity of said weighting agent produces a spotting pill having a density of at least about 9 ppg.

49. A high fluid loss spotting pill comprising:
   a carrier fluid;
   a first quantity of weighting agent adapted to produce a density substantially the same as the density of a drilling fluid used to drill a formation being treated;
   a second quantity of suspending agent effective to suspend said weighting agent in said carrier fluid;
   an LCM consisting essentially of:
      a third quantity of acid soluble mineral fiber; and;
      an amount of calcium carbonate particulate comprising granular form and flake form;
   said quantity, said amount, and said form being adapted to form a substantially impermeable, acid soluble filter-cake upon injection of said composition with an effective carrier fluid into said wellbore and defluidization.

50. The high fluid loss spotting pill of claim 49 wherein said granular form is fine grain and said flake form is fine grain.

51. The high fluid loss spotting pill of claim 49 wherein said first quantity of said weighting agent produces a spotting pill having a density of at least about 9 ppg.

52. The high fluid loss spotting pill of claim 50 wherein said first quantity of said weighting agent produces a spotting pill having a density of at least about 9 ppg.

53. The high fluid loss spotting pill of claim 49 wherein said carrier fluid is water based.

54. The high fluid loss spotting pill of claim 49 wherein said carrier fluid is oil based.

55. A high fluid loss spotting pill comprising:
   a carrier fluid;
   a first quantity of weighting agent adapted to produce a density substantially the same as the density of a drilling fluid used to drill a formation being treated;
   a second quantity of suspending agent effective to suspend said weighting agent in said carrier fluid;
   an amount of LCM consisting essentially of calcium carbonate particulate;
   said quantity, said amount, and said form being adapted to form a substantially impermeable, acid soluble filter-cake upon injection of said composition with an effective carrier fluid into said wellbore and defluidization;
   wherein the following weight percent of the composition passes through screens having the following mesh sizes:

| | |
|---|---|
| 10 | 5% to 10% |
| 14 | 5% to 10% |
| 18 | 1% to 5% |
| 20 | 1% to 5% |
| 25 | 1% to 5% |
| >25 | 87% to 65% |

56. The high fluid loss spotting pill of claim 49 wherein the following weight percent of the composition passes through screens having the following mesh sizes:

| | |
|---|---|
| 10 | 8% |
| 14 | 7% |
| 18 | 3% |
| 20 | 1% |
| 25 | 1% |

57. The high fluid loss spotting pill of claim 45 wherein said third quantity is 10 wt. % or more of said composition.

58. The high fluid loss spotting pill of claim 45 wherein said third quantity is about 25 wt. % of said composition.

59. The high fluid loss spotting pill of claim 57 wherein said amount is about 50 wt. % of said composition.

60. The high fluid loss spotting pill of claim 58 wherein said amount is about 50 wt. % of said composition.

61. The high fluid loss spotting pill of claim 46 wherein said third quantity is 10 wt. % or more of said composition.

62. The high fluid loss spotting pill of claim 46 wherein said third quantity is about 25 wt. % of said composition.

63. The high fluid loss spotting pill of claim 61 wherein said amount is about 50 wt. % of said composition.

64. The high fluid loss spotting pill of claim 62 wherein said amount is about 50 wt. % of said composition.

65. The high fluid loss spotting pill of claim 49 wherein said third quantity is 10 wt. % or more of said composition.

66. The high fluid loss spotting pill of claim 49 wherein said third quantity is about 25 wt. % of said composition.

67. A high fluid loss spotting pill comprising:
   a carrier fluid;
   a first quantity of weighting agent adapted to produce a density substantially the same as the density of a drilling fluid used to drill a formation being treated;
   a second quantity of suspending agent effective to suspend said weighting agent in said carrier fluid;
   an LCM consisting essentially of:
      a third quantity of acid soluble mineral fiber, said third quantity comprising 10% or more of said composition; and;
      an amount of calcium carbonate particulate, said amount comprising about 50 wt. % of said composition;
   said quantity, said amount, and said form being adapted to form a substantially impermeable, acid soluble filter-cake upon injection of said composition with an effective carrier fluid into said wellbore and defluidization.

68. A high fluid loss spotting pill comprising:
   a carrier fluid;
   a first quantity of weighting agent adapted to produce a density substantially the same as the density of a drilling fluid used to drill a formation being treated;
   a second quantity of suspending agent effective to suspend said weighting agent in said carrier fluid;
   an LCM consisting essentially of:
      a third quantity of acid soluble mineral fiber, said third quantity comprising 25% or more of said composition; and;
      an amount of calcium carbonate particulate, said amount comprising about 50 wt. % of said composition;
   said quantity, said amount, and said form being adapted to form a substantially impermeable, acid soluble filter-cake upon injection of said composition with an effective carrier fluid into said wellbore and defluidization.

69. The high fluid loss spotting pill of claim 50 wherein said third quantity is 10 wt. % or more of said composition.

70. The high fluid loss spotting pill of claim 50 wherein said third quantity is about 25 wt. % of said composition.

71. The high fluid loss spotting pill of claim 69 wherein said amount is about 50 wt. % of said composition.

72. The high fluid loss spotting pill of claim 70 wherein said amount is about 50 wt. % of said composition.

73. A high fluid loss spotting pill comprising:
- a carrier fluid;
- an LCM consisting essentially of an amount and form of acid soluble mineral particulate comprising granular form and flake form;
- said amount and said form being adapted to form a substantially impermeable, acid soluble filtercake upon injection of said composition with said carrier fluid into a wellbore and defluidization;
- a first quantity of weighting agent; and
- a second quantity of suspending agent effective to suspend said weighting agent, said suspending agent being selected from the group consisting of attapulgite, quaternized attapulgite, and a combination thereof.

74. The high fluid loss spotting pill of claim 2 wherein said suspending agent is selected from the group consisting of attapulgite and quaternized attapulgite.

75. The high fluid loss spotting pill of claim 3 wherein said suspending agent is selected from the group consisting of attapulgite and quaternized attapulgite.

76. The high fluid loss spotting pill of claim 4 wherein said suspending agent is selected from the group consisting of attapulgite and quaternized attapulgite.

77. The high fluid loss spotting pill of claim 12 wherein said suspending agent is selected from the group consisting of attapulgite and quaternized attapulgite.

78. A high fluid loss spotting pill comprising:
- a carrier fluid;
- a first quantity of weighting agent;
- a second quantity of suspending agent effective to suspend said weighting agent, wherein said suspending agent is selected from the group consisting of attapulgite mud quaternized attapulgite;
- an LCM consisting essentially of:
  - a third quantity of acid soluble mineral fiber; and;
  - an amount of acid soluble mineral particulate comprising a carbonate of an alkaline earth metal, wherein said particulate is a combination of granular form and flake form;
- said third quantity, said amount and said form being adapted to form a substantially impermeable, acid soluble filtercake upon injection of said composition with said carrier fluid into a wellbore and defluidization.

79. The high fluid loss spotting pill of claim 14 wherein said suspending agent is selected from the group consisting of attapulgite and quaternized attapulgite.

80. A high fluid loss spotting pill comprising:
- a carrier fluid;
- a first quantity of weighting agent adapted to produce a density substantially the same as the density of a drilling fluid used to drill a formation being treated;
- a second quantity of suspending agent effective to suspend said weighting agent in said carrier fluid wherein said suspending agent is selected from the group consisting of attapulgite and quaternized attapulgite;
- an LCM consisting essentially of:
  - a third quantity of acid soluble mineral fiber; and;
  - an amount of acid soluble mineral particulate;
- said third quantity, said amount, and said form being adapted to form a substantially impermeable, acid soluble filtercake upon injection of said composition with an effective carrier fluid into said wellbore and defluidization.

81. The high fluid loss spotting pill of claim 28 wherein said suspending agent is selected from the group consisting of attapulgite and quaternized attapulgite.

82. The high fluid loss spotting pill of claim 33 wherein said suspending agent is selected from the group consisting of attapulgite and quaternized attapulgite.

83. The high fluid loss spotting pill of claim 37 wherein said suspending agent is selected from the group consisting of attapulgite and quaternized attapulgite.

84. The high fluid loss spotting pill of claim 42 wherein said suspending agent is selected from the group consisting of attapulgite and quaternized attapulgite.

85. The high fluid loss spotting pill of claim 45 wherein said suspending agent is selected from the group consisting of attapulgite and quaternized attapulgite.

86. The high fluid loss spotting pill of claim 46 wherein said suspending agent is selected from the group consisting of attapulgite and quaternized attapulgite.

87. The high fluid loss spotting pill of claim 49 wherein said suspending agent is selected from the group consisting of attapulgite and quaternized attapulgite.

88. The high fluid loss spotting pill of claim 50 wherein said suspending agent is selected from the group consisting of attapulgite and quaternized attapulgite.

89. The high fluid loss spotting pill of claim 52 wherein said suspending agent is selected from the group consisting of attapulgite and quaternized attapulgite.

90. A high fluid loss spotting pill comprising:
- a carrier fluid;
- an LCM consisting essentially of an amount and form of acid soluble mineral particulate;
- said amount and said form being adapted to form a substantially impermeable, acid soluble filtercake upon injection of said composition with said carrier fluid into a wellbore and defluidization;
- a first quantity of weighting agent; and
- a second quantity of suspending agent effective to suspend said weighting agent, wherein said suspending agent comprises a ratio of attapulgite to quaternized attapulgite.

91. A high fluid loss spotting pill comprising:
- a carrier fluid;
- an LCM consisting essentially of an amount and form of acid soluble mineral particulate;
- said amount and said form being adapted to form a substantially impermeable, acid soluble filtercake upon injection of said composition with said carrier fluid into a wellbore and defluidization;
- a first quantity of weighting agent; and
- a second quantity of suspending agent effective to suspend said weighting agent, said suspending agent comprising a ratio of attapulgite to quaternized attapulgite;
- wherein said first quantity of weighting agent is adapted to produce a density substantially the same as the density of a drilling fluid used to drill a formation being treated.

92. A high fluid loss spotting pill comprising:
- a carrier fluid;
- a first quantity of weighting agent adapted to produce a density substantially the same as the density of a drilling fluid used to drill a formation being treated;

a second quantity of suspending agent effective to suspend said weighting agent in said carrier fluid, said suspending agent comprising a ratio of attapulgite to quaternized attapulgite;

an amount of LCM consisting essentially of calcium carbonate particulate;

said quantity, said amount, and said form being adapted to form a substantially impermeable, acid soluble filter-cake upon injection of said composition with an effective carrier fluid into said wellbore and defluidization.

93. The high fluid loss spotting pill of claim 91 wherein said ratio is about 50:50.

94. The high fluid loss spotting pill of claim 92 wherein said ratio is about 50:50.

* * * * *

UNITED STATES PATENT AND TRADEMARK OFFICE
CERTIFICATE OF CORRECTION

PATENT NO.   : 6,790,812 B2
DATED        : September 14, 2004
INVENTOR(S)  : Halliday, William S. et al.

It is certified that error appears in the above-identified patent and that said Letters Patent is hereby corrected as shown below:

<u>Column 6,</u>
Line 66, delete "HYDRIL" and insert -- annular blowout preventer --.

Signed and Sealed this

Eleventh Day of April, 2006

JON W. DUDAS
*Director of the United States Patent and Trademark Office*